Figure 1:
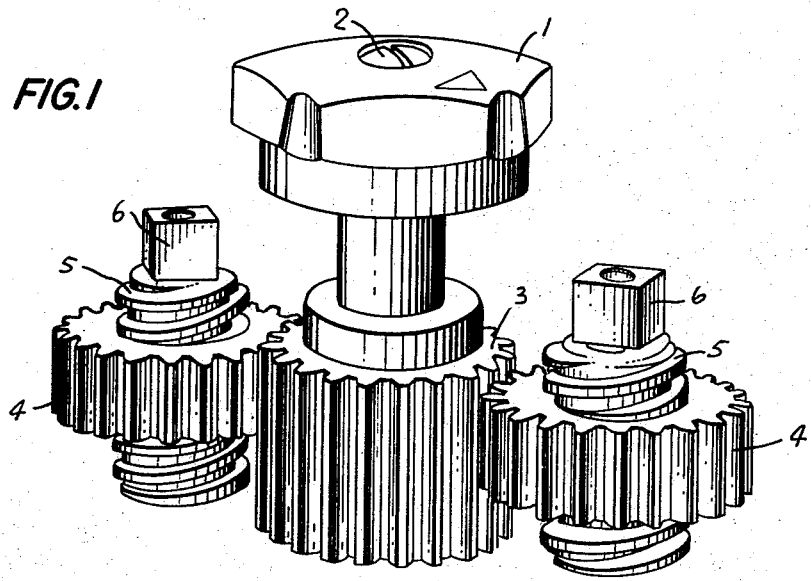

June 22, 1965     C. SORENSEN ETAL     3,190,146
DEVICE FOR SIMULTANEOUS ADJUSTMENT OF SEVERAL ELEMENTS
DEPENDING UPON THE SAME ADJUSTMENT VALUE
Filed Aug. 3, 1961

United States Patent Office 3,190,146
Patented June 22, 1965

3,190,146
DEVICE FOR SIMULTANEOUS ADJUSTMENT OF SEVERAL ELEMENTS DEPENDING UPON THE SAME ADJUSTMENT VALUE
Carl Sörensen and Helmar Trost Nielsen, Nordborg, Denmark, assignors to Danfoss ved ing. M. Clausen, Nordborg, Denmark, a company of Denmark
Filed Aug. 3, 1961, Ser. No. 130,725
Claims priority, application Germany, Aug. 3, 1960, D 33,937
5 Claims. (Cl. 74—665)

The present invention is concerned with a device for the adjustment of a plurality of elements which are all dependent upon the same adjustment value, and the invention is more particularly concerned with a device for the adjustment of several temperature adjustment springs in a thermostatically-controlled valve.

In many cases, it is desired to apply a controlling adjustment value to a plurality of adjustable elements. These elements, for example, may be placed near each other in spatial relationship but be adapted to actuate different systems. Alternatively, the several elements may actuate the same system, but in this case the adjustment value is modified by different functions introduced. Taking, for example, a thermostatically-controlled valve for use with the heat conductor in a heating or refrigerating plant, the adjustment value, e.g. the desired room temperature, may be applied to the control valves which are placed in various rooms, or this value may be applied to a single control valve, whereupon the adjustment temperature is compared with several quantities other than the room temperature, e.g. with the flow temperature of the heat conductor. Difficulties generally encountered in arrangements heretofore used include the fact that the elements to be adjusted will not have the same characteristics of dependence, or the fact that the same initial point of adjustment will not apply to them.

It is an object of the present invention to provide a device which is effective to avoid the foregoing drawbacks and disadvantages.

It is a further object to provide a novel, compact control device.

According to the present invention, there is provided a device which comprises a main driver gear wheel which is secured to the knob for manually setting the desired adjustment value, in combination with a plurality of follower gear wheels for each particular element to be adjusted. The follower gear wheels are threadedly mounted on threaded spindles so that a turning of the main driver gear wheel causes a simultaneous axial displacement of all follower gear wheels. More specifically, each follower gear wheel is provided with a bore with an internal thread, and the threaded spindles are mounted stationarily.

This device is a space-saving construction which can be formed from a minimum of parts and all of these parts are readily machined. The device makes it possible, by turning the manual adjustment knob to displace the follower gear wheels in an axial direction. Initial adjustment of the follower gear wheels in relation to the driver gear wheel is very simple, because the follower gear wheels will not be fixed in relative position until they are engaged with the driver gear wheel. Until that time, the follower gear wheels can easily be brought into the correct initial position by turning each gear wheel independently, as will be described below.

For taking into account the various characteristics of dependence between the device and the elements to be controlled, either the gear ratio of each follower gear wheel and the driver gear wheel can be varied, or the thread pitch for the follower gear wheel and the associated spindle can be varied. In most cases, however, identical follower gear wheels and identical threaded spindles are fully suitable, especially where there is an additional possibility of appropriate variation, e.g. the use of adjustable regulating springs.

It is a feature of the invention that the interengaged threads of the follower gear wheels and the associated spindle not only serve the purpose of axial displacement of the gear wheels, but are preferably made self-braking, in conventional manner, thus rendering unnecessary any additional arrangements for maintaining the regulating value to which the wheels have been adjusted.

It is a further feature of the construction of the adjustment device of this invention that it lends itself to simple relationships among the cooperating members, e.g. it is readily possible to let each adjustment spring bear directly against the external surface of the follower gear wheel with which it is associated.

Figure 2:
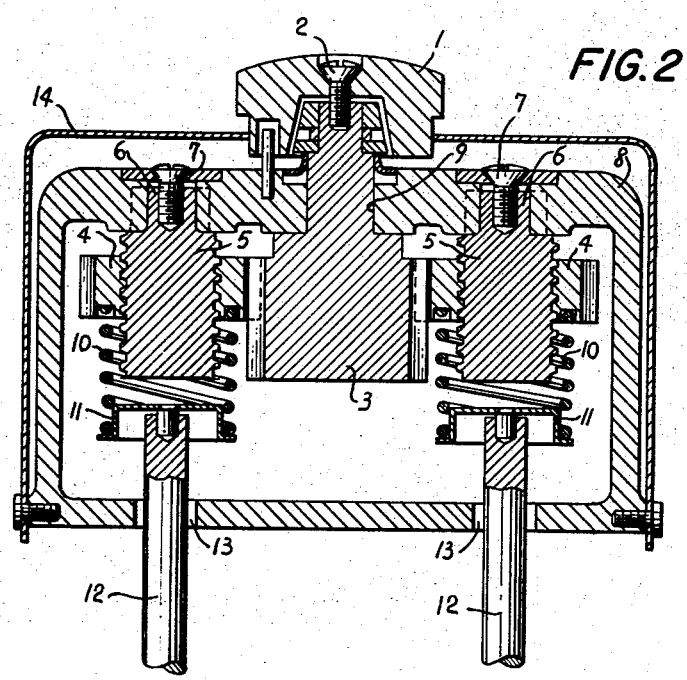

Other objects and features of this invention will be readily apparent from the following detailed description of the invention with particular reference to an illustrative embodiment thereof, taken in connection with the accompanying drawing, wherein, FIG. 1 is a perspective view of the principal parts of an adjustment device embodying features of the invention; and FIG. 2 is a longitudinal sectional view of the parts shown in a casing with associated elements in FIG. 1 and illustrating them as assembled to provide the complete adjustment device.

Referring to the drawing, the main manual adjustment knob 1 is firmly united with the driver gear wheel 3 by means of a screw 2 which connects the knob to the shaft of the gear wheel 3. The driver gear wheel 3 meshes with the two follower gear wheels 4 which are threadedly carried on the threaded spindles 5. The spindles 5 are mounted stationarily in a housing 8 by engagement of their square heads 6 in corresponding apertures in the housing and by means of the screws 7. The housing 8 is additionally provided with a bore 9 for receiving the shaft of the driver gear wheel 3.

The lower, external face of each follower gear wheel 4 engages directly a regulating spring 10, which is to be adjusted, and which is partly received in a recess in said face. By means of the cup 11, the regulating spring 10, which is suitably a coil spring, exerts pressure against the operating rod 12, which extends out of the housing 8 through the bore 13. The opposite ends of the rods 12 (not shown) are engaged by the thermostatic operating elements (not shown). In the simplest case, the movement of rods 12 can be utilized directly for opening or closing a valve. A cover 14 secured, as by screws, to the housing 8, encloses the entire device, leaving only the manual adjustment knob 1 visible from the exterior.

The housing 8 is open at its sides and when the cover 14 is removed there is free access to the interior of the housing. When mounting the device, in association with the elements to be actuated, the driver gear wheel 3 is disengaged, and each follower gear wheel 4, which is then freely rotatable, is then turned to that position which is required for the desired initial adjustment. Then the driver gear wheel 3 is introduced upwardly to engage its threads with the follower wheels and its shaft is inserted in the bearing bore 9. The adjustment knob 1 is then screwed to the end of the shaft of gear wheel 3 which protrudes from the bore. When the driver gear wheel 3 has been thus installed, the initial positions of the follower gear wheels 4 are fixed. From these individual, initial positions, which may be different for each gear wheel 4, the follower gear wheels 4 will cover the same axial displacement when the adjustment knob 1 is turned. They will correspondingly actuate the operating rods. The force applied to the rods can be varied to suit individual requirements by employing different adjustment springs 10.

In the construction shown in the drawing and described above, two spindles and follower gear wheels have been shown. It will be apparent, however, that additional spindles and follower gear wheels may be associated with the single driver gear wheel, depending upon the number of elements to be controlled.

It will be understood that various other changes and modifications in addition to those indicated above may be made in the embodiment herein described and shown in the drawing without departing from the scope of the invention as defined in the appended claims. It is intended, therefore, that all matter contained in the foregoing description and in the drawing shall be interpreted as illustrative only and not as limitative of the invention.

We claim:

1. A device for the simultaneous adjustment of a plurality of elements depending upon the same adjustment value comprising, in combination, a casing, a rotatable driver gear wheel in said casing, a single manually-actuatable adjustment knob connected to said wheel but disposed exteriorly of said casing, a plurality of follower gear wheels adapted to be connected to each element to be adjusted, said follower gear wheels being supported in meshing engagement with said driver gear wheel, and threaded spindles carrying said follower gear wheels, said follower gear wheels being each provided with a bore with an internal thread, said threaded spindles being engaged with said internal thread and being mounted stationarily, whereby rotation of the driver gear wheel in response to turning movements of the manually-actuatable adjustment knob causes a simultaneous axial displacement of all of said follower gear wheels.

2. A device for the simultaneous adjustment of a plurality of elements depending upon the same adjustment value comprising, in combination, a casing, a rotatable driver gear wheel in said casing, a single manually-actuatable adjustment knob connected to said wheel but disposed exteriorly of said casing, a plurality of follower gear wheels adapted to be connected to each element to be adjusted, said follower gear wheels being supported in meshing engagement with said driver gear wheel, and threaded spindles carrying said follower gear wheels, said follower gear wheels being each provided with a bore with an internal thread, said threaded spindles being engaged with said internal thread and being mounted stationarily, whereby rotation of the driver gear wheel in response to turning movements of the manually-actuatable adjustment knob causes a simultaneous axial displacement of all of said follower gear wheels, rods extending from said casing and being adapted to act upon said elements to be adjusted, bearing means carried by the end of each rod in said casing, and a plurality of adjustment springs, each spring bearing at one end directly against the external surface of a follower gear wheel and bearing at a second end directly against a bearing means.

3. A device as defined in claim 1, wherein all of the follower gear wheels are identical and all of the threaded spindles are identical.

4. A device as defined in claim 1, wherein the threads of each follower gear wheel and its associated spindle are self-braking.

5. A device as defined in claim 1, further comprising a plurality of adjustment springs and each spring bearing directly against the external surface of a follower gear wheel.

References Cited by the Examiner

UNITED STATES PATENTS 2,966,073  12/60  Olson ---------------- 74—470
3,078,731  2/63   Cator ---------------- 70—89

DON A. WAITE, *Primary Examiner.*